Nov. 23, 1965   E. C. PECK   3,219,813
ANTI-GLARE DEVICE FOR HEADLIGHTS
Filed Oct. 21, 1963
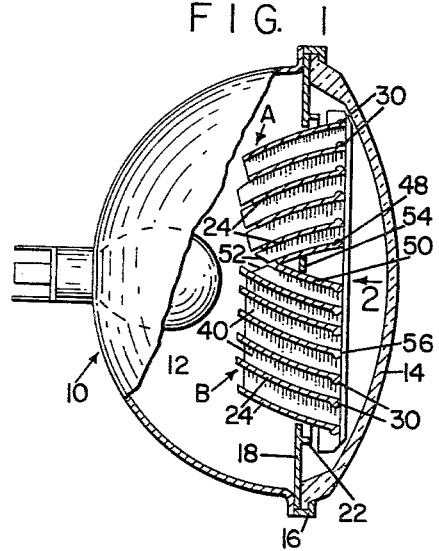
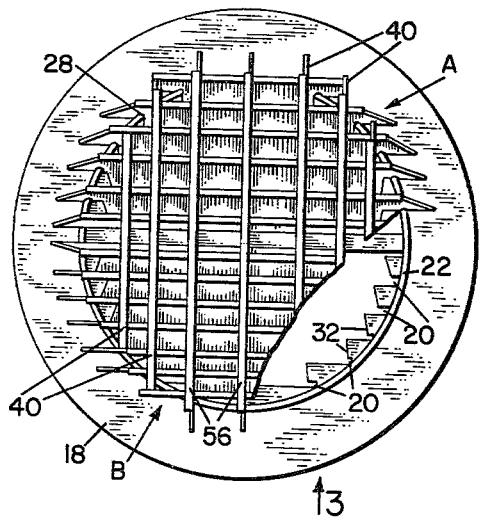
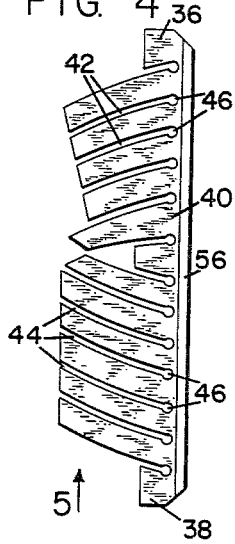
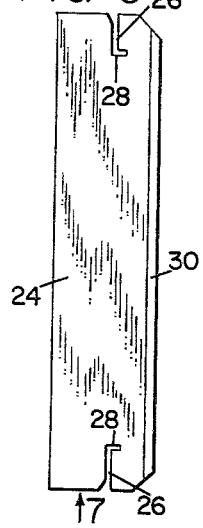
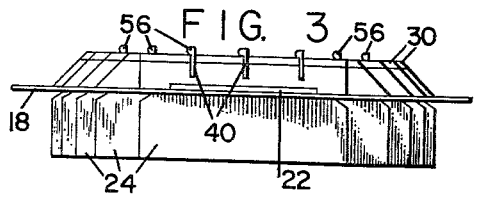
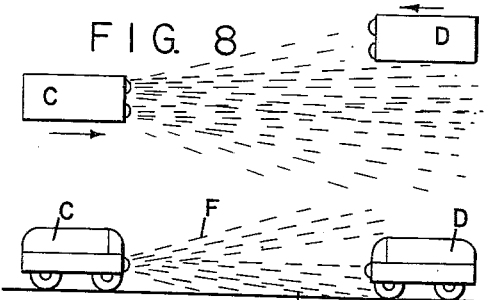
INVENTOR
EDMOND C. PECK
BY *Charles R. Fay*
ATTORNEY

United States Patent Office 3,219,813
Patented Nov. 23, 1965

3,219,813
ANTI-GLARE DEVICE FOR HEADLIGHTS
Edmond C. Peck, 1298 Providence St.,
Whitinsville, Mass.
Filed Oct. 21, 1963, Ser. No. 317,538
7 Claims. (Cl. 240—46.39)

This invention relates to a louver or shutter-type of antiglare device to be applied to the headlights of vehicles. It is well known that the glare from bright headlights of vehicles raises great problems in night driving. The "high" beam of the usual automobile headlight is disturbing to the eyes of all oncoming drivers and particularly to persons whose eyes are sensitive to bright light.

This invention relates to a construction which includes the provision of a series of louvers or shutters extending horizontally across the headlight lamp body behind its glass protective lens, these louvers being divided into two series, an upper series in which the louvers are located on an incline upwardly from the source of illumination toward the area to be illuminated, and a lower section of louvers which are inclined in the opposite direction and tend to cause the major portion of the light from the source of illumination to be directed generally downwardly as well as forwardly.

The louvers are arranged in a frame including a series of vertical blinds which are constructed and arranged so as to hold the louvers in position in a circular annular frame extending about the same and also at the same time preventing excess dispersion of light laterally to either side and particularly preventing dispersion of light toward the oncoming vehicle, i.e., to the left of the vehicle equipped with the new device.

Further objects of the invention include the provision of simple and convenient means for mounting the aforesaid louver and blind construction with respect to a conventional type of headlight so that it is easy to change a conventional headlight into a new antiglare headlight; and also it is easy to utilize the device in original equipment by the use of parts substantially the same, so that the present invention is in the nature of an addition to already existing equipment rather than making it necessary to completely revise the entire structure of the headlamp.

The invention further relates to arrangements and combinations of parts which will be hereinafter described and more particularly set forth in the appended claims.

Reference is to be had to the accompanying drawings, in which:

FIG. 1 is a general vertical section for a vehicle headlight embodying the present invention;

FIG. 2 is a view in front elevation of these antiglare attachment, looking in generally in the direction of arrow 2 in FIG. 1;

FIG. 3 is a bottom plan view, looking in the direction of arrow 3 in FIG. 2;

FIG. 4 is a view in elevation illustrating one of the blinds;

FIG. 5 is a bottom plan view thereof, looking in the direction of arrow 5 in FIG. 4;

FIG. 6 is a view in elevation showing one of the louvers;

FIG. 7 is a bottom plan view thereof, looking in the direction of arrow 7 in FIG. 6, and FIGS. 8 and 9 are diagrammatic illustrations showing the general effect of the antiglare device.

In FIG. 1 the reference numeral 10 indicates in general a conventional headlamp body including a source of illumination of any kind 12 whether filament or bulb. This is of general and well known construction and includes a more or less conventional lens portion 14 which is ordinarily secured with respect to the periphery of the body portion 10 by means of a band or the like such as generally indicated at 16. The details of connection of these parts is not part of the present invention, but it is pointed out that in modern lamps the lens 14 is often secured to the body portion 10 by being fused thereto where both of these members are made of glass, in which case the entire device is in the nature of a disposable single unit. In any event, the construction of the present invention is such as to be included between the lamp body and the lens 14 whether by a separable band or by being included between the two glass parts of modern manufacture and fused permanently in position.

An annular flat ring 18 is provided and this ring extends between the peripheries of the lamp body 10 and lens 14 as clearly shown in FIG. 1. This element as well as the blinds and louvers to be described may be conveniently made of plastic or similar material. The annular ring 18 is flat and is provided with a series of interior notches indicated generally at 20 in FIG. 2, inside a bead 22 which as shown in FIG. 1 extends in a forward direction annularly about the inner periphery of the annular member 18. It will be noted that these notches provide slots located in horizontal pairs across the opening of the annular flat member 18.

The slots 20 are provided to receive the louvers which extend in a horizontal direction. One louver is shown in detail in FIG. 6. All of the louvers are substantially alike and comprise opaque elongated body portions indicated in FIG. 6 at 24 having at their ends inwardly directed keyhole shaped slots 26, 26 for cooperation with slots 20 by which means the various louvers are held at their ends. The inwardly directed terminal portions 28, 28 of slots 26 accommodate the bead 22.

The louvers are of different lengths as clearly shown in FIG. 2 so as to be accommodated to the annular shape of the device and are divided into upper and lower units. These units are indicated at A and B respectively. At the forward edge of each louver 24 there is a bead 30 which extends to one side only thereof as shown in FIG. 7. The louvers in series A are shown in FIGS. 1 and 2 to number six and in series B to number seven. The louvers of series A are directed upwardly to the right and are curved in section. The louvers in series B extend downwardly to the right.

All of the louvers are held in their positions by means of the blinds 40 shown in detail in FIG. 4, these blinds being held at their ends against the shoulders which are indicated at 32 in FIG. 2 by their end portions 36, 38. Between these end portions they are provided with a series of slots 42 to hold the series A louvers, and a series of slots 4 receiving the series B louvers, so it is seen that the louvers are held in the positions shown in FIG. 1 by means of the particular relationship of the slots 42 and 44 in the blinds. At the inner end of each slot 42 and 44 there is an enlargement indicated at 46 which receives the beads 30 and it is to be noted that the louvers are arranged as shown in FIG. 1 with the beads 30 extending only downwardly in the series B louvers and only upwardly in the series A louvers.

It is also to be noted that the louvers in series A are not all the same in width, the uppermost louver of this series being the widest and those below gradually decreasing in width to the lowermost louver, indicated by the reference numeral 48.

This particular louver 48 cooperates with the topmost louver of the lower series B which is indicated at 50, coming together at the rear edges thereof as indicated at 52, and being supported between by means of a cross bar or the like which is indicated at 54. This cross bar may form a part of the annular member 18 if desired, but in any event this construction strengthens and rigidifies the entire device as shown in FIG. 2.

The blinds 40 are provided with beads also which are indicated at 56 and these beads 56 are so arranged on the blinds that they all extend toward the right side of the road as is illustrated in FIG. 3.

It is also to be noted that the upper louvers or shutters comprising series A are curved and are located at a different angle from the lower louvers comprising series B, the angle of the series A louvers or shutters being steeper or on a greater incline than those of series B.

The side surfaces of the louvers or shutters are highly glazed as it is important that sufficient light should emerge through the shutter in order to provide for the required illumination of the road, etc.

It will be seen from an inspection of the diagrams in FIGS. 8 and 9 that the effect of the above described device is to direct the light beams of vehicle C generally away from oncoming vehicle D and to also direct the major portion of the light proceeding from the source of illumination downwardly as indicated at E and a smaller portion thereof upwardly as at F. The effect of this is that the light is bounced upward and away from the line of approaching drivers and also down and to the right so that illumination of the road is preserved but the major portion of the glare from the headlights does not impinge upon the eyes of the oncoming drivers and therefore sufficient illumination is provided at all times but this illumination is not such as to adversely affect the eyesight of the oncoming drivers.

The number of louvers, angles, etc. has been carefully worked out to provide for a balance between the requirements of illumination and the reduction of the glare, whereas the exact angles and numbers of the louvers, shutters and blinds is not critical, at least within a reasonable range, nevertheless the relationship of the greater angle of series A louvers and the lesser angle of series B louvers, and the greater number of series B louvers is found to be important. Also, the curvature of the shutters and the "capped" or beaded edge thereof serve to redirect the light in such a way as to tend to produce an optimum condition between conditions of glare and clear vision for average driving conditions at night. The blinds also may if desired be slightly curved to the right to throw the light beams toward the curb, this being enhanced by the capped or beaded edges on the blinds.

Having thus described my invention and the advantages thereof, I do not wish to be limited to the details herein disclosed, otherwise than as set forth in the claims, but what I claim is:

1. Antiglare device for vehicle headlights comprising a unit adapted to be interposed between the main body portion of a vehicle lamp and the lens therefor, said unit being characterized by the provision of two series of generally horizontal louvers extending in mutually spaced relation across the headlamp, said louvers being divided into two separate series, an upper series and a lower series, the louvers of the upper series being less in number than the louvers of the lower series and being located on a greater angle with respect to the horizontal than are the louvers in the lower series, the louvers in the upper series being on curves extending generally upwardly away from the source of illumination in the lamp body, and the louvers in the lower series being on curves extending generally downwardly away from the source of illumination in the lamp body, generally vertical blinds arranged in mutually spaced relation across the device with interengaging means between the blinds and the louvers, each tending to hold the other in the desired position, and a flat, notched, annular ring to hold the assembled louvers and blinds in position between the body of the lamp and the lens therefor, the louvers and blinds engaging in the notches in said ring, beads forming enlargements along the edges of the louvers and blinds, the widths of the upper series of louvers decreasing from top to bottom of the series.

2. The device of claim 1 wherein the beads in the upper series of louvers extend upwardly and the beads in the lower series of louvers extending downwardly.

3. The device of claim 1 wherein the beads at the forward edges of the upright blinds extend toward one side of the device.

4. The device of claim 1 including a bead extending about the inner periphery of said ring.

5. The device of claim 1 wherein the curves of the louvers in the upper series are located in a relation to the lamp body so that light beams from the latter impinge on the lower concave surfaces of the curved louvers.

6. The device of claim 1 wherein the widths of the lower series of louvers are substantially equal.

7. The device of claim 1 wherein the lowermost louver of the upper series and the uppermost louver of the lower series substantially contact at the rear edges thereof as respects the lamp body, and including a bar extending in the same direction as said louvers and between and contacting the same.

References Cited by the Examiner

UNITED STATES PATENTS

| | | | |
|---|---|---|---|
| 1,422,393 | 7/1922 | Waddell | 240—46.31 |
| 1,536,146 | 5/1925 | Saffert | 240—46.31 |
| 1,568,922 | 1/1926 | Robinson | 240—46.31 |
| 1,793,569 | 2/1931 | Toft | 240—46.31 |
| 2,282,136 | 5/1942 | Jorgensen | 240—46.31 |
| 2,863,039 | 12/1948 | Ruschell | 240—46.31 X |
| 3,115,310 | 12/1963 | Hofman | 240—46.43 X |

FOREIGN PATENTS 79,639    2/1952    Norway.

NORTON ANSHER, *Primary Examiner.*